United States Patent
Olson et al.

(10) Patent No.: US 12,072,808 B2
(45) Date of Patent: Aug. 27, 2024

(54) DATA STORAGE

(71) Applicant: Arm Limited, Cambridge (GB)

(72) Inventors: Jens Olson, San Jose, CA (US); Jared Corey Smolens, Santa Clara, CA (US)

(73) Assignee: Arm Limited, Cambridge (GB)

( * ) Notice: Subject to any disclaimer, the term of this patent is extended or adjusted under 35 U.S.C. 154(b) by 81 days.

(21) Appl. No.: 18/063,478

(22) Filed: Dec. 8, 2022

(65) Prior Publication Data
US 2024/0193089 A1 Jun. 13, 2024

(51) Int. Cl.
*G06F 12/0875* (2016.01)
(52) U.S. Cl.
CPC .. *G06F 12/0875* (2013.01); *G06F 2212/1024* (2013.01); *G06F 2212/221* (2013.01); *G06F 2212/452* (2013.01)
(58) Field of Classification Search
CPC .... G06F 3/0656; G06F 3/0659; G06F 3/0655; G06F 3/0644; G06F 9/544; G06F 12/0875; G06F 2212/1024; G06F 2212/221; G06F 2212/452
See application file for complete search history.

(56) References Cited

U.S. PATENT DOCUMENTS

| | | | | |
|---|---|---|---|---|
| 11,029,958 B1* | 6/2021 | Zhang | ................... | G06F 9/3016 |
| 2014/0075144 A1* | 3/2014 | Sanders | .................... | G06F 5/10 |
| | | | | 711/170 |
| 2020/0371978 A1* | 11/2020 | Simpson | ................. | G06F 13/28 |
| 2022/0137873 A1* | 5/2022 | Liljedahl | ............... | G06F 3/0656 |
| | | | | 711/154 |

OTHER PUBLICATIONS

Darlene A. Stewart and W. Morven Gentleman, Non-Stop Monitoring and Debugging on Shared-Memory Multiprocessors. 1997, Proceedings of PDSE '97: 2nd International Workshop on Software Engineering for Parallel and Distributed Systems, Boston, MA, USA, pp. 263-269 (Year: 1997).*

* cited by examiner

*Primary Examiner* — Curtis James Kortman
(74) *Attorney, Agent, or Firm* — EIP US LLP

(57) ABSTRACT

A processor comprising a first storage managed as a circular buffer to store a plurality of data structures. Each data structure comprises: an identifier, a size indicator and first data associated with instructions for execution of a task. The processor is configured for searching for a data structure in the first storage. A data structure subsequent to the tail data structure can be located using a storage address in the first storage of a tail data structure and the size indicator of all data structures preceding the second data structure among the plurality of data structures. When a data structure is found, the task may be executed based at least in part on the first data of the found data structure.

20 Claims, 7 Drawing Sheets

DATA STORAGE

BACKGROUND OF THE INVENTION

Field of the Invention

The present invention relates to methods, processors, and non-transitory computer-readable storage media for processing a request to execute a task.

Description of the Related Technology

Certain data processing techniques, such as neural network processing, requires transportation of data between different units of a computer. Moreover, efficient processing of data may involve repeatably performing same or similar operations on several subsequent blocks of data. Its desirably to efficiently handle storage and access to information usable for data processing.

SUMMARY

According to a first aspect of the present disclosure there is provided a processor comprising: a first storage managed as a circular buffer to store a plurality of data structures, each data structure comprising: an identifier, a status indicator having one of a plurality of values including a first and a second predetermined value, a size indicator and first data associated with instructions for execution of a task; a second storage to store a first pointer indicative of a storage address in the first storage of a tail data structure of the plural data structures, and a second pointer indicative of a storage address in the first storage of a head data structure of the plural data structures. The processor may be configured to process a first request to execute a task by: searching for a data structure in the first storage having an identifier matching a first identifier associated with the first request, wherein a second data structure subsequent to the tail data structure in the first storage is located in the first storage using the first pointer and the size indicator of all data structures preceding the second data structure among the plurality of data structures, wherein the second pointer indicates the last data structure among the plurality of data structures; upon finding a data structure having an identifier matching the first identifier, wherein the status indicator of said data structure having the first predetermined value, executing the task based at least in part on the first data of the data structure having a matching identifier.

According to a second aspect of the present disclosure there is provided a method performed by a processor, the method comprising: accessing a first storage managed as a circular buffer and storing a plurality of data structures, each data structure comprising: an identifier, a status indicator having one of a plurality of values including a first and a second predetermined value, a size indicator and first data associated with instructions for execution of a task; accessing a second storage storing a first pointer indicative of a storage address in the first storage of a tail data structure of the plural data structures, and a second pointer indicative of a storage address in the first storage of a head data structure of the plural data structures; processing a first request to execute a task by: searching for a data structure in the first storage having an identifier matching a first identifier associated with the first request, wherein a second data structure subsequent to the tail data structure in the first storage is located in the first storage using the first pointer and the size indicator of all data structures preceding the second data structure among the plurality of data structures, wherein the second pointer indicates the last data structure among the plurality of data structures; upon finding a data structure having an identifier matching the first identifier, wherein the status indicator of said data structure having the first predetermined value, executing the task based at least in part on the first data of the data structure having a matching identifier.

According to a third aspect of the present disclosure there is provided non-transitory computer-readable storage medium comprising a set of computer-readable instructions stored thereon which, when executed by at least one processor, are arranged to cause the at least one processor to: accessing a first storage managed as a circular buffer and storing a plurality of data structures, each data structure comprising: an identifier, a status indicator having one of a plurality of values including a first and a second predetermined value, a size indicator and first data associated with instructions for execution of a task; accessing a second storage storing a first pointer indicative of a storage address in the first storage of a tail data structure of the plural data structures, and a second pointer indicative of a storage address in the first storage of a head data structure of the plural data structures; processing a first request to execute a task by: searching for a data structure in the first storage having an identifier matching a first identifier associated with the first request, wherein a second data structure subsequent to the tail data structure in the first storage is located in the first storage using the first pointer and the size indicator of all data structures preceding the second data structure among the plurality of data structures, wherein the second pointer indicates the last data structure among the plurality of data structures; upon finding a data structure having an identifier matching the first identifier, wherein the status indicator of said data structure having the first predetermined value, executing the task based at least in part on the first data of the data structure having a matching identifier.

BRIEF DESCRIPTION OF THE DRAWINGS

Further features will become apparent from the following description of examples, which is made with reference to the accompanying drawings.

DETAILED DESCRIPTION

Figure 1:
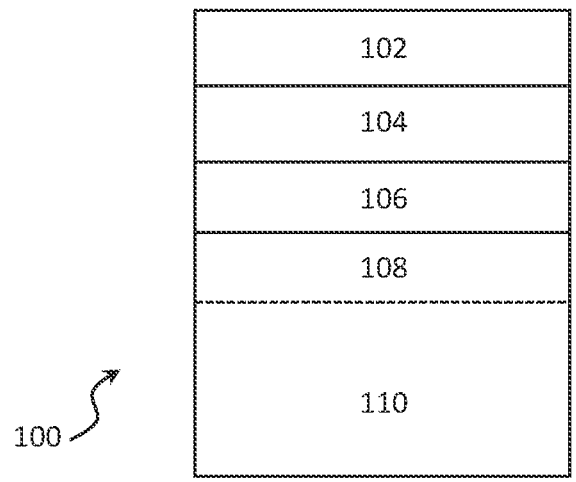
FIG. 1 is a schematic diagram of a data structure usable when executing a task according to examples.

This disclosure describes procedures, as well as methods, systems and computer-readable media for providing and using a cache for storing data structures (such as descriptors) to be used when executing a task.

A first aspect of the disclosure relates to a processor comprising (having local access to) a first storage managed as a circular buffer (circular queue, cyclic buffer, ring buffer, etc.,). The first storage stores a plurality of data structures that each comprises an identifier, a status indicator having one of a plurality of values including a first and a second predetermined value, a size indicator and first data associated with instructions for execution of a task. The processor also comprises a second storage (having local access to) to store a first pointer indicative of a storage address in the first storage of a tail data structure of the plural data structures, and a second pointer indicative of a storage address in the first storage of a head data structure of the plural data structures. When traversing the plurality of data structures, the processor starts at the tail data structure using the first pointer. To get to the next data structure, the size of the tail data structure is added to the first pointer to get the storage address of said next data structure, and so on.

Typically, efficient processing of data in hardware such as a GPU, or units within a GPU such as a neural engine or graphics processor, may involve repeatably performing same or similar set of tasks (operations) on several subsets of data to be processed (e.g., blocks of data in a multi-dimensional tensor). Consequently, caching the data structures (which comprises first data associated with instructions for execution of a task) may be advantageous. However, for certain types of tasks, the size of such first data may vary. For example, for neural processing tasks (e.g., the task relates to operations in a neural network), the first data may comprise a variable number of pointers to tensor data and weights to be used in the neural processing. Moreover, depending on the task at hand, the operations performed on the tensor data may vary and consequently also the size of the first data. Advantageously, storing the size of each data structure among the plurality of data structures allows for different sized data structures, since the size parameters in conjunction with the first pointer can be used to traverse the first storage to locate data structures subsequent to the tail data structure. In examples, this may be achieved by the processor being configured to process a first request to execute a task by searching for a data structure in the first storage having an identifier matching a first identifier associated with the first request, wherein a second data structure subsequent to the tail data structure in the first storage is located in the first storage using the first pointer and the size indicator of all data structures preceding the second data structure among the plurality of data structures, wherein the second pointer indicates the last data structure among the plurality of data structures. In some examples, the identifier comprises a virtual address which thus functions as an identifier of the data structure, which provides a flexible and secure way of identifying a data structure in this context. By caching the data structures in local memory, repeating task may be executed with reduced need to transfer such data structures to the processor (e.g., from memory external to the processor). Moreover, using a caching strategy, all (or most) data structures needed to execute a task may be readily available to the processor, facilitating concurrent execution of more than one task at the same time. This for example may reduce the latency in the processing of the request to execute a task, by reducing external memory accesses. Moreover, this for example may allow the processing performed by the processor to be performed more efficiently.

It should be noted that in some examples, the data structure comprises instructions for execution of the task. In other examples, the data structure comprises pointers to such instructions stored in other (typically local) memory.

In some examples, the request to execute the task may comprise the first identifier. In other examples, the first identifier may be otherwise associated with the first request, for example, the first request may comprise a pointer to the first identifier.

In examples, upon finding a data structure having an identifier matching the first identifier, wherein the status indicator of said data structure having the first predetermined value, the processor is configured to execute the task based at least in part on the first data of the data structure having a matching identifier. Including a status indicator having one of a plurality of values including a first and a second predetermined value may provide flexibility to the processes described herein, since this allows ways of informing the processor that e.g., a task is not ready to be executed, or that the data structure does not include all necessary first data to execute the task, or similar reasons as to why execution of the task is not possible at the moment.

In examples, the processor is configured to, upon finding a data structure having an identifier matching the first identifier (i.e., the identifier associated with the request), wherein the status indicator of the data structure having an identifier matching the first identifier having the second predetermined value, waiting for the status indicator to change value to the first predetermined value and processing the first request again. Consequently, the processor may be configured to wait until the data structure is ready to be used to execute the task, providing a flexible and low-complexity process to execute a task.

In some examples, the request to execute a task is associated with a first size indicator. The size indicator may be used in case the processor does not find a data structure having a matching identifier (comprising an identifier which matches the first identifier). In examples, the processor may determine the available space of the first storage and see if the missing data structure may be cached in it. Since the first storage is managed as a circular buffer, the available size may be found in a low complexity way by using the size of the first storage and the first and second pointers. For example, the first pointer may indicate the address in the first storage for the first word (e.g., a 64-bit segment) of the tail data structure. The second pointer may indicate the address of the first free word in the first storage, such as the first 64-bit segment directly subsequent to the head data structure as stored in the first storage. As used herein "a word" of a storage is a is a fixed-sized datum handled as a unit by the processor.

In some examples, storing the requested data structure in the first storage comprises, setting the status indicator of the requested data structure to the second predetermined value, wherein upon storage of the requested data structure being completed, updating the status indicator of the requested data structure to the first predetermined value. Advantageously, this embodiment facilitates concurrent processing of multiple requests to execute a task by the processor since it may safeguard against the case where a cached data structure not being completely stored in the first storage while another request needs the same data structure.

In some examples, each data structure among the plurality of data structures stored in the first storage is associated with a lock indicator having one of a plurality of values including a third and a fourth predetermined value. In some examples, the processor is further configured to process the first request to execute the task by: while executing the task based at least in part on first data of any data structure among the plurality of data structures stored in the first storage, setting the lock indicator of said any data structure to the fourth predetermined value, and upon execution of the task being completed, updating the lock indicator of said any data structure to the third predetermined value, and wherein storing the requested data structure in the first storage comprises, setting the lock indicator of the requested data structure to the fourth predetermined value, wherein upon storage of the requested data structure being completed, updating the lock indicator of the requested data structure to the third predetermined value.

This embodiment may provide further flexibility to the process of executing a task since certain functionality in the processor may be stopped, changed, or triggered based on if a data structure in the cache is currently being stored or used for execution of a task.

In some examples, in case the processor does not find a data structure having a matching identifier, and upon the available space of the first storage is less than the first size indicator, data structures among the plurality of data structures may need to be overwritten (deleted, invalidated) with a new data structure needed to execute the task. Advantageously, such deletion of data structures is done from the tail, since moving the first pointer to refer to a data structure immediately subsequent to the tail data structure may be less complex compared to move the second pointer. However, it may be preferred to not delete data structures being locked (currently being stored or used for execution of a task). In these examples, the processor is configured such that upon not finding a data structure having a matching identifier, and upon the available space of the first storage is less than the first size indicator, iteratively increasing the available space of the first storage until meeting or exceeding the first size indicator or until the lock indicator associated with the tail data structure having the fourth predetermined value by updating the first pointer to be indicative of a storage address in the first storage of a data structure immediately subsequent to the tail data structure among the plurality of data structures stored in the first storage, whereby the data structure immediately subsequent to the tail data structure becomes the tail data structure. In other words, the first pointer is iteratively moved along the plurality of data structures (towards the head) starting at the tail data structure to increase the available space in the first storage. Upon the available space of the first storage meeting or exceeding the first size indicator, the processor may request a data structure having an identifier matching the first identifier from external memory, storing the requested data structure in the first storage as a new tail data structure among the plurality of data structures stored in the first storage, updating the first pointer in the storage to be indicative the storage address in the first storage of the new tail data structure, and executing the task based at least in part on the first data of the requested data structure.

In some embodiments, the tail data structure may be locked (the lock indicator associated with the tail data structure have the fourth predetermined value). In this case, the available size of the first storage may be increased by iteratively updating the second pointer to be indicative of a storage address in the first storage of a data structure immediately preceding to the head data structure among the plurality of data structures stored in the first storage, whereby the data structure immediately preceding to the head tail data structure becomes the head data structure. In other words, the second pointer is iteratively moved along the plurality of data structures (towards the tail) starting at the head data structure to increase the available space in the first storage. Note that in some embodiments, this may require a full traversal through the plurality of data structures to find the head data structure and remove it by moving the second pointer. Upon the available space of the first storage meeting or exceeding the first size indicator, the processor may request a data structure having an identifier matching the first identifier from external memory, storing the requested data structure in the first storage as a new tail data structure among the plurality of data structures stored in the first storage, updating the first pointer in the storage to be indicative the storage address in the first storage of the new tail data structure, and executing the task based at least in part on the first data of the requested data structure. Advantageously, this embodiment allows for insertion of new data structures even if the tail data structure is locked, since data structures may be deleted also from the head. Thereby flexibility of the processes described herein may be increased.

In some examples, when both the tail data structure and the head data structure is locked, the processor may be configured to wait for the lock indicator of one of the head data structure and the tail data structure to change value to the third predetermined value and then process the first request again. For example, the processor may be configured to always reprocess any requests to execute a task that has been placed on hold every time a lock indicator of a data structure among the plurality of data structures change value from the fourth predetermined value to the third predetermined value.

In some examples, the processor may be configured to receive one or more further requests to execute a task while execution of the task of the first request is ongoing. Advantageously, this may allow for increased efficiency and flexibility of the processes described herein. With this approach, the processor need not wait until execution of one task has finished before starting another task. Instead, tasks can be overlapped, meaning that multiple tasks can be performed at the same time as each other.

In some examples, in which the processor is configured to receiving a second request to execute a task while execution of the task of the first request is ongoing, each data structure among the plurality of data structures stored in the first storage may comprise a first (sub) lock indicator associated to the first request and a second (sub) lock indicator associated to the second request. For example, the lock indicator may comprise one bit lock per active task.

In some examples, the processor comprises a handling unit configured to reading the first data of the data structure having a matching identifier from the first storage and executing the task based at least in part on the read first data.

In some examples, a maximum size of a data structure is less than half the size of the first storage. This means that two data structures may always fit in the first storage, facilitating overlapping execution of tasks.

In some examples, the task relates to operations in a neural network. For example, a task may implement a layer of processing of a predefined neural network, in which a feature map is convolved with neural network weights. The data structures stored in the first storage may correspond to a plurality of layers of processing in the predefined neural network. Optimizing neural network compilers will often organize a sequence of multiple data structures into a "cascade" which are executed as a sequence of tasks. A cascade typically appears as a predictable repeated sequence of tasks, where each task in the sequence references a different data structure, but the sequence of tasks is iteratively executed across an input feature map in 4D space (i.e., across a multi-dimensional tensor). By implementing a cache (the first storage) of data structures, latency in the processing of the multi-dimensional tensor by the processor may be reduced, by reducing external memory accesses.

This for example allows the processing performed by the processor to be performed more efficiently. It should be noted that the task may relate to graphical processing tasks such as compute shaders.

In some examples, the processor is part of a graphics processing unit (GPU). The processor may thus be a dedicated hardware resource, such as a neural engine or a shader core, forming part of the GPU.

In a second aspect, the present disclosure provides a method performed by a processor. The method comprises: accessing a first storage managed as a circular buffer and storing a plurality of data structures, each data structure comprising: an identifier, a status indicator having one of a plurality of values including a first and a second predetermined value, a size indicator and first data associated with instructions for execution of a task. The method further comprises accessing a second storage storing a first pointer indicative of a storage address in the first storage of a tail data structure of the plural data structures, and a second pointer indicative of a storage address in the first storage of a head data structure of the plural data structures. A first request to execute a task is processed by: searching for a data structure in the first storage having an identifier matching a first identifier associated with the first request, wherein a second data structure subsequent to the tail data structure in the first storage is located in the first storage using the first pointer and the size indicator of all data structures preceding the second data structure among the plurality of data structures, wherein the second pointer indicates the last data structure among the plurality of data structures; upon finding a data structure having an identifier matching the first identifier, wherein the status indicator of said data structure having the first predetermined value, executing the task based at least in part on the first data of the data structure having a matching identifier. As explained with reference to the first aspect, this allows for reduced latency as well as caching of variable size data structures.

In examples, the method further comprises upon finding a data structure having an identifier matching the first identifier, wherein the status indicator of the data structure having an identifier matching the first identifier having the second predetermined value, waiting for the status indicator to change value to the first predetermined value and processing the first request again.

In examples, the method further comprises upon not finding a data structure having a matching identifier, determining an available space of the first storage using a size of the first storage and the first and second pointer; upon the available space of the first storage meeting or exceeding a first size indicator associated with the first request: requesting a data structure having an identifier matching the first identifier from external memory, storing the requested data structure in the first storage as a new tail data structure among the plurality of data structures stored in the first storage, updating the first pointer in the storage to be indicative the storage address in the first storage of the new tail data structure, and executing the task based at least in part on the first data of the requested data structure.

The second aspect may generally have the same features and advantages as the first aspect.

In a third aspect, the present disclosure provides a non-transitory computer-readable storage medium comprising a set of computer-readable instructions stored thereon which, when executed by at least one processor, are arranged to cause the at least one processor to: accessing a first storage managed as a circular buffer and storing a plurality of data structures, each data structure comprising: an identifier, a status indicator having one of a plurality of values including a first and a second predetermined value, a size indicator and first data associated with instructions for execution of a task; accessing a second storage storing a first pointer indicative of a storage address in the first storage of a tail data structure of the plural data structures, and a second pointer indicative of a storage address in the first storage of a head data structure of the plural data structures; processing a first request to execute a task by: searching for a data structure in the first storage having an identifier matching a first identifier associated with the first request, wherein a second data structure subsequent to the tail data structure in the first storage is located in the first storage using the first pointer and the size indicator of all data structures preceding the second data structure among the plurality of data structures, wherein the second pointer indicates the last data structure among the plurality of data structures; upon finding a data structure having an identifier matching the first identifier, wherein the status indicator of said data structure having the first predetermined value, executing the task based at least in part on the first data of the data structure having a matching identifier. As explained with reference to the first aspect, this allows for reduced latency as well as caching of variable size data structures.

The third aspect may generally have the same features and advantages as the first aspect.

To illustrate these aspects and examples, FIG. 1 shows a schematic diagram of a data structure 100 usable when executing a task. The data structure 100 generally comprises two parts. One part that may be referred to as a tag. The tag may comprise an identifier 102, a status indicator 104 and a size indicator 106. In some examples, the data structure further comprises a lock indicator 108. The second part of the data structure 100 is the data 110 associated with instructions for execution of a task. The tag of the data structure 100 typically have the same size across a plurality of data structures while the data 110 associated with the instructions may differ in size between data structures depending on the task to be executed. The identifier 102 may comprise any type of identification tag or job ID. In some examples, the identifier comprises a virtual address (VA), which hereinafter will be used as an example of the identifier 102.

In examples, the tag may be 64 bits in size. The VA 102 may be a 48-bit virtual address. The size indicator 106, which indicates the size of the entire data structure (tag+instructions) may be 8 bits and may indicate the size of the data structure in 64-bit words. Status indicator typically is only one bit, but this depends on how many values the status indicator may represent. The lock indicator 108 may be 1-N bits, depending on how many concurrent tasks the lock indicator may represent. In some examples, the lock indicator is 4 bits. Any remaining bits of the 64 bits may be left unused.

A size of the data 110 associated with instructions for execution of a task may vary as mentioned above. For example, a size of such data 110 of a first data structure may be 33 64-bit words, which gives a total size of the entire data structure 110 of 34 64-bit words. In other examples, the size of data 110 of a second data structure may be 48 64-bit words, which gives a total size of the entire data structure 110 of 49 64-bit words. This is just examples and the data structure 100 may have any suitable size. In the event that the data 110 comprises pointers to the instructions stored in other (typically local) memory, the size of the data structure may be reduced.

Figure 2:
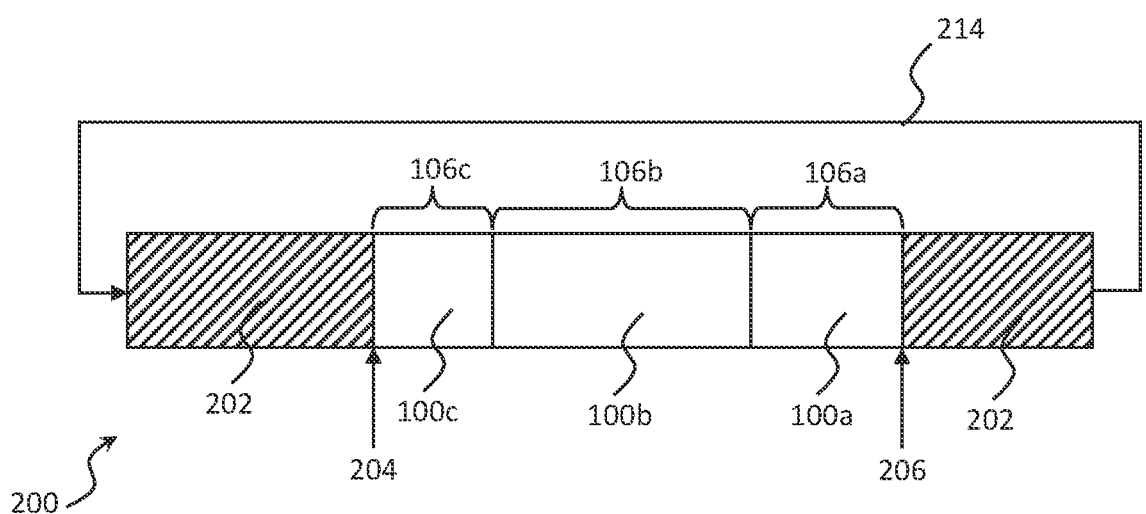
FIG. 2 is schematic representations of a storage managed as a circular buffer for storing data structures of FIG. 1 according to examples.

FIG. 2 shows by way of example a first storage 200 to store a plurality of data structures 100a-c. The first storage 200 is managed 214 as a circular buffer, in that fixed-size storage is managed as if it were connected end-to-end. The useful property of a circular buffer is that it does not need to have its elements shuffled around when one is consumed (deleted, invalidated, removed). If a non-circular buffer were used, it would be necessary to shift all elements when one is consumed. In other words, the circular buffer is well-suited as a FIFO (first in, first out) queue. In the example of FIG. 2, the first storage 200 comprises three data structures 100a-c. Each data structure 100a-c has a respective size 106a-c. The first storage 200 further has available space 202, i.e., storage not used by any of the data structures 100a-c. Among the plurality of data structures 100a-c in FIG. 2, the right most data structure 100a is the head data structure, and the left most data structure 100c is the tail data structure. A first pointer 204 (represented by an arrow in FIG. 2) is indicative of a storage address in the first storage 200 of the tail data structure 100c of the plural data structures 100a-c. In this example, the first pointer indicates the address in the first storage 200 for the first word (e.g., a 64-bit segment) of the tail data structure 100c. In examples, the first pointer indicates the address in the first storage 200 of the tag of the tail data structure 100c. A second pointer 206 (represented by an arrow in FIG. 2) is indicative of a storage address in the first storage 200 of the head data structure 100a of the plural data structures 100a-c. In this example, the second pointer indicates the address in the first storage 200 for the first free word in the first storage 200, such as the first word (64-bit segment) directly subsequent to the head data structure 100a as stored in the first storage 202.

The first storage 200 may be sized to hold eight normal sized data structures 100, or five large sized data structures 100. For example, the size of the first storage may be set to 2 kB. Other suitable sizes may apply, such as 1 kB, 4 kB, etc.

Figure 3:
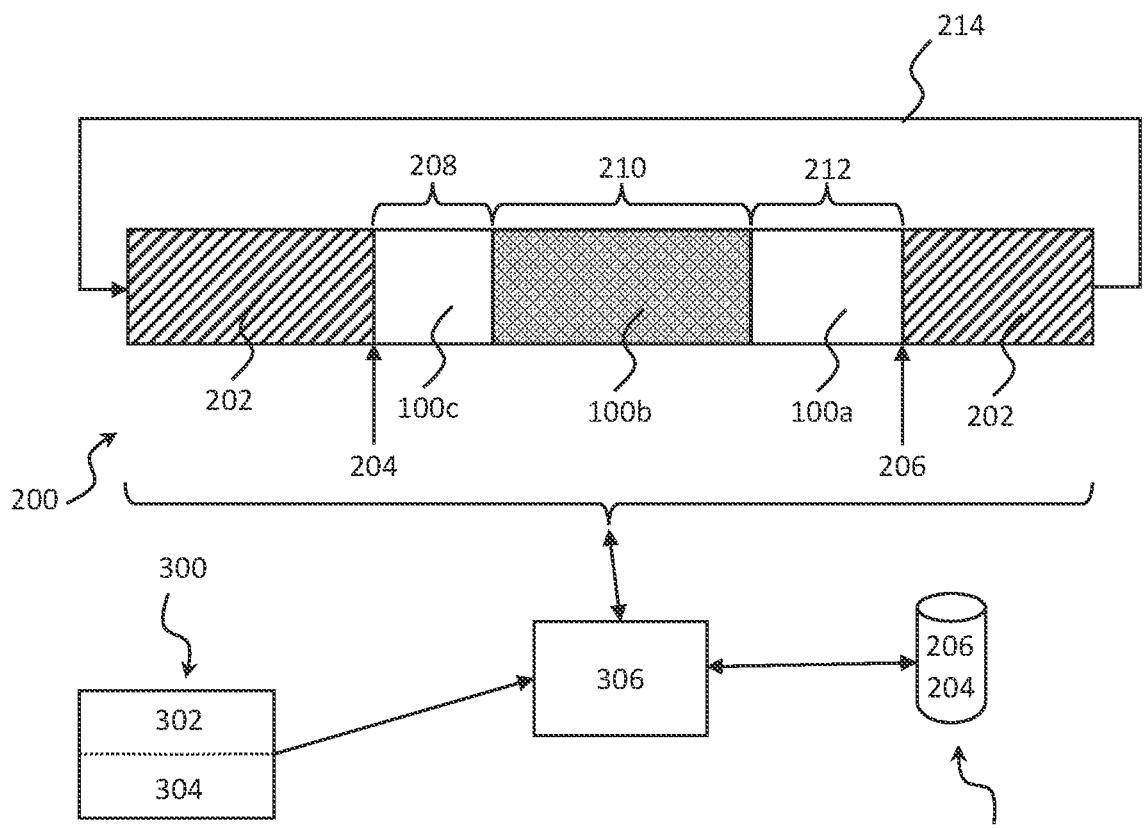
FIG. 3 is a schematic representation of a system for execution of a task according to examples.

FIG. 3 is a schematic representation of a system for execution of a task according to examples. In this example, a processor 306 comprises (or otherwise having access to) the first storage 200 (as described in conjunction with FIG. 2 above) and a second storage 308. Both these storages 200, 308 may be local to the processor 306, such as SRAM storages. The processor 306 is configured to process a first request 300 to execute a task. The first request 300 comprises (or is otherwise associated with, e.g., via a pointer in the request 300) a first VA 302. In examples, the first request 300 comprises (or is otherwise associated with, e.g., via a pointer in the request 300) a first size indicator. The processor may receive the request 300 from another processor (hardware unit) such a command processing unit. The command processing unit may have access to memory external to the processor 306, such as L2 memory. In the L2 memory, all data structures for execution of a task may be stored to be transferred to the processor 306 for execution. However, the bandwidth between such external memory and the processor 306 (via a bus) may be limited. Consequently, requesting a data structure from L2 memory and transferring the requested data structure to the processor may introduce latency in the execution of the task. As such, local caching of data structures that are repeatedly used may improve efficiency and reduce latency.

The second storage 308 stores a first pointer 204 indicative of a storage address in the first storage of a tail data structure 100c of the plural data structures 100a-c, and a second pointer 206 indicative of a storage address in the first storage 200 of a head data structure 100a of the plural data structures 100a-c. The first storage 200 and the second storage 308 may be separate storages, or form part of a same storage (e.g., as two different partitions).

The processor 306 is configured to search for a data structure in the first storage 200 having a VA matching the first VA 302 associated with the first request 300. The processor starts by checking the VA of the tail data structure 100c, which is found using the first pointer 204. In this example, the VA of the tail data structure 100c does not match the first VA 302. The processor may then locate a next data structure 100b (being subsequent, i.e., to the right in FIG. 2, to the tail data structure 100c). This is done using the first pointer and the size indicator of the head data structure 100c. By combining the first pointer and the size indicator, the tag of the next data structure 100b is found. In this case, the second data structure 100b has a VA matching the first VA 302. This is indicated in FIG. 3 by the dotted marking of the second data structure 100b.

Upon finding the data structure 100b having a VA matching the first VA 302, the status indicator (ref 104 in FIG. 1) is checked by the processor. If the status indicator has a value which indicates that the status of the data structure 100b is ready to be used for execution of the task (i.e., having a valid status or similar), the processor 306 may execute the task based at least in part on the first data of the data structure 100b having the matching VA. In some examples, execution of a task result in setting the lock indicator of the data structure 100b being executed to a fourth predetermined value (e.g., "locked"), and upon execution of the task being completed, updating the lock indicator of the data structure 100b to a third predetermined value (e.g., "unlocked")

Figure 4:
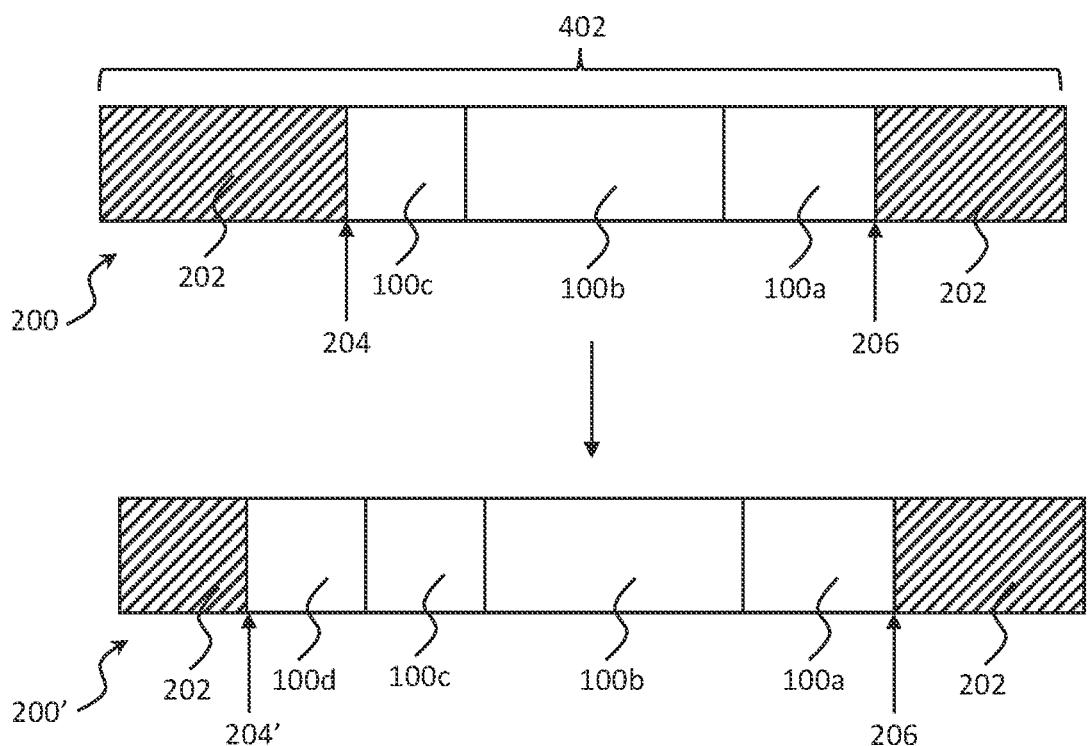
FIGS. 4-6 are schematic representations of usage of storage managed as a circular buffer for storing data structures of FIG. 1 according to examples.

FIG. 4 schematically shows an example of usage of the first storage 200 managed as a circular buffer for storing data structures of FIG. 1. In this example, the processor (not shown) did not find a data structure having a matching VA (e.g., matching to the first VA of the request 300 in FIG. 3). A new data structure with the VA of the first request thus needs to be requested and inserted into the cache 200. To do this, the processor is configured to determine an available space of the first storage, i.e., the size of the unused portion 202 of the first storage 200. This is done using a total size 402 (for example 2 kB) of the first storage 200 and the first 204 and second pointer 206. The available size is then compared to a size indicator (ref 304 in FIG. 3) of the request, which represents the size of the data structure corresponding to the VA 302 of the request in external memory.

In the example of FIG. 4, the available size of the first storage 200 exceeds the first size indicator. A data structure 100d having a VA matching the first VA is requested from external memory (not shown). The lower part of FIG. 4 shows the updated first storage 200' where the new data structure 100d is stored as a new tail data structure among the plurality of data structures 100a-d now stored in the first memory 200'. In some examples, while storing the new data structure 100d, a status indicator of the new data structure 100d may be updated to indicate if storing of the data structure 100d is completed or not. In these examples, storing the requested data structure in the first storage comprises: setting the status indicator of the requested data structure 100d to a second predetermined value (e.g., representing "fetch"), wherein upon storage of the requested data structure 100d being completed, updating the status indicator of the requested data structure to a first predetermined value (e.g., representing "completed" or "valid"). In some examples, also a lock indicator of the new data structure 100d may be updated during storage. In these examples, storing the requested data structure in the first storage comprises: setting the lock indicator of the requested data structure 100d to a fourth predetermined value (e.g., representing "locked"), wherein upon storage of the requested data structure being completed, updating the lock indicator of the requested data structure 100d to a third predetermined value (e.g., representing "unlocked").

Storing of the new data structure 100d result in the first pointer 204' being updated in the second storage (not shown) to be indicative the storage address in the first storage 200' of the new tail data structure 100d. Finally, the task is executed based at least in part on the first data of the requested data structure 100d. During execution, the lock indicator of the data structure 100d may be updated as described in conjunction with FIG. 3.

Figure 5:
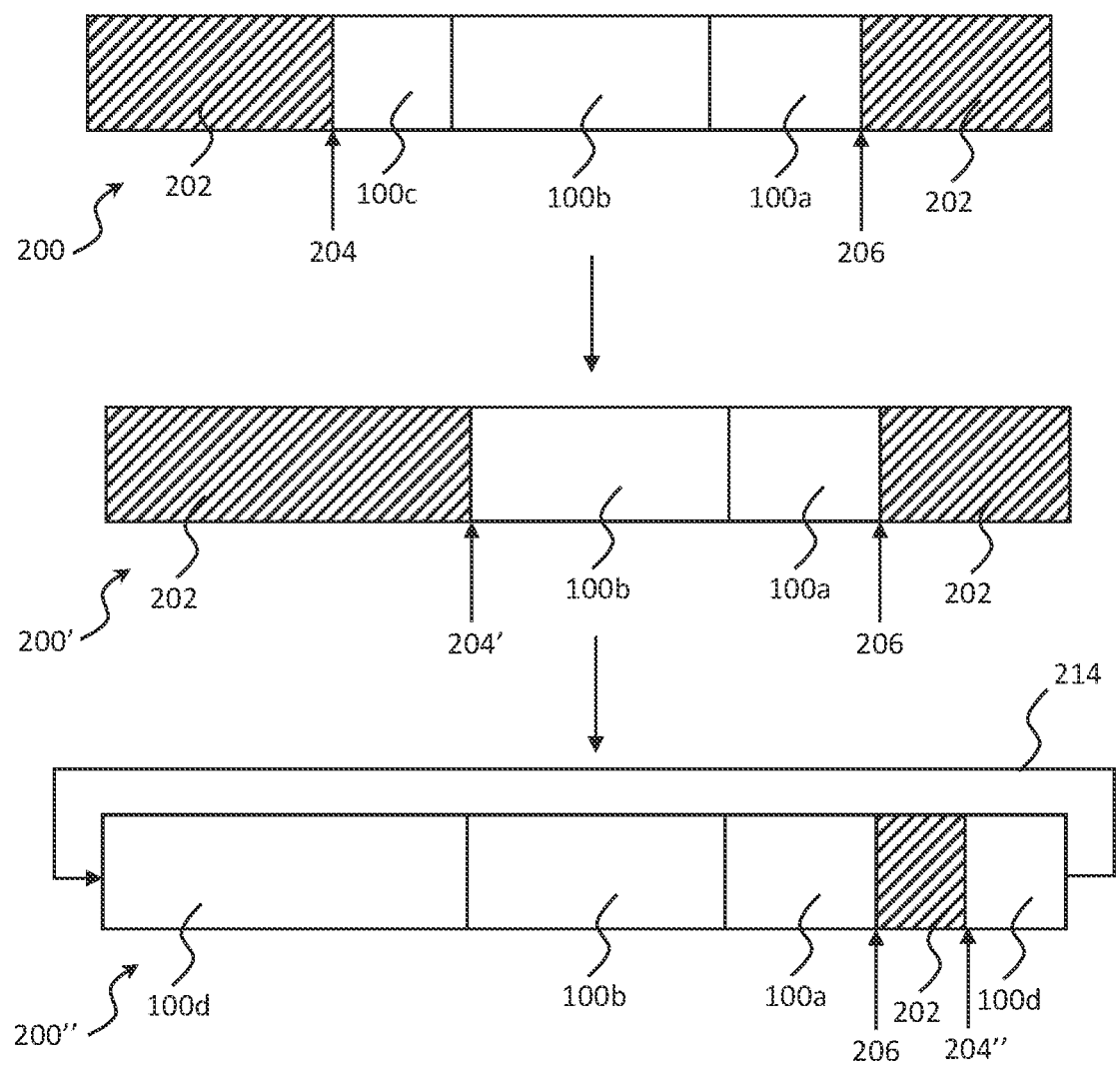

FIG. 5 schematically shows an example of usage of the first storage 200 managed as a circular buffer for storing data structures of FIG. 1. In this example, the processor (not shown) did not find a data structure having a matching VA (e.g., matching to the first VA of the request 300 in FIG. 3). A new data structure with the VA of the first request is thus needed to be requested and inserted into the cache 200. To do this, the processor is configured to determine an available space of the first storage, i.e., the size of the unused portion 202 of the first storage 200. This is done as described in conjunction with FIG. 4. The available size is then compared to a size indicator (ref 304 in FIG. 3) of the request, which represents the size of the data structure corresponding to the VA 302 of the request in external memory.

In the case of FIG. 5, the available space of the first storage 200 is less than first size indicator. To fit a new data structure corresponding to the request, the available space must increase. This is shown in the middle part of FIG. 5. The available space of the first storage 200' is increased by updating the first pointer 204 to be indicative of a storage address in the first storage of a data structure 100b immediately subsequent to the tail data structure 100a among the plurality of data structures stored in the first memory 200, whereby the data structure 100b immediately subsequent to the tail data structure becomes the tail data structure. The processor determines the available space of the updated first storage 200'. In case it is still not big enough to hold the new data structure, the process would be repeated such that the next data structure 100a would be the tail data structure. However, in the example of FIG. 5, the available space of the first storage 200' exceeds the first size indicator. Consequently, the processor may request a data structure having a VA matching the first VA from external memory, storing the requested data structure in the first storage 200''. During the storage of the data structure 104d, the lock indicator and the status indicator may be updated as described in conjunction with FIG. 4. Storage is shown in the lower part of FIG. 5, where the requested data structure 100d is stored in the first storage 200'' as a new tail data structure among the plurality of data structures 100a,b,d stored in first storage 200''. The first pointer 204' is updated in the second storage to be indicative the storage address in the first storage of the new tail data structure 100d. FIG. 5 shows the first storage 200'' being managed 214 as a circular buffer in that the new data structure 100d continues from the end of the first storage 200'' to the beginning of the first storage 200''. The first pointer 204'' is thus updated to an address "later" in the first storage 200'' compared to the second pointer 206. Finally, the processor executes the task based at least in part on the first data of the requested data structure 100d. During execution, the lock indicator of the data structure 100d may be updated as described in conjunction with FIG. 3.

Figure 6:
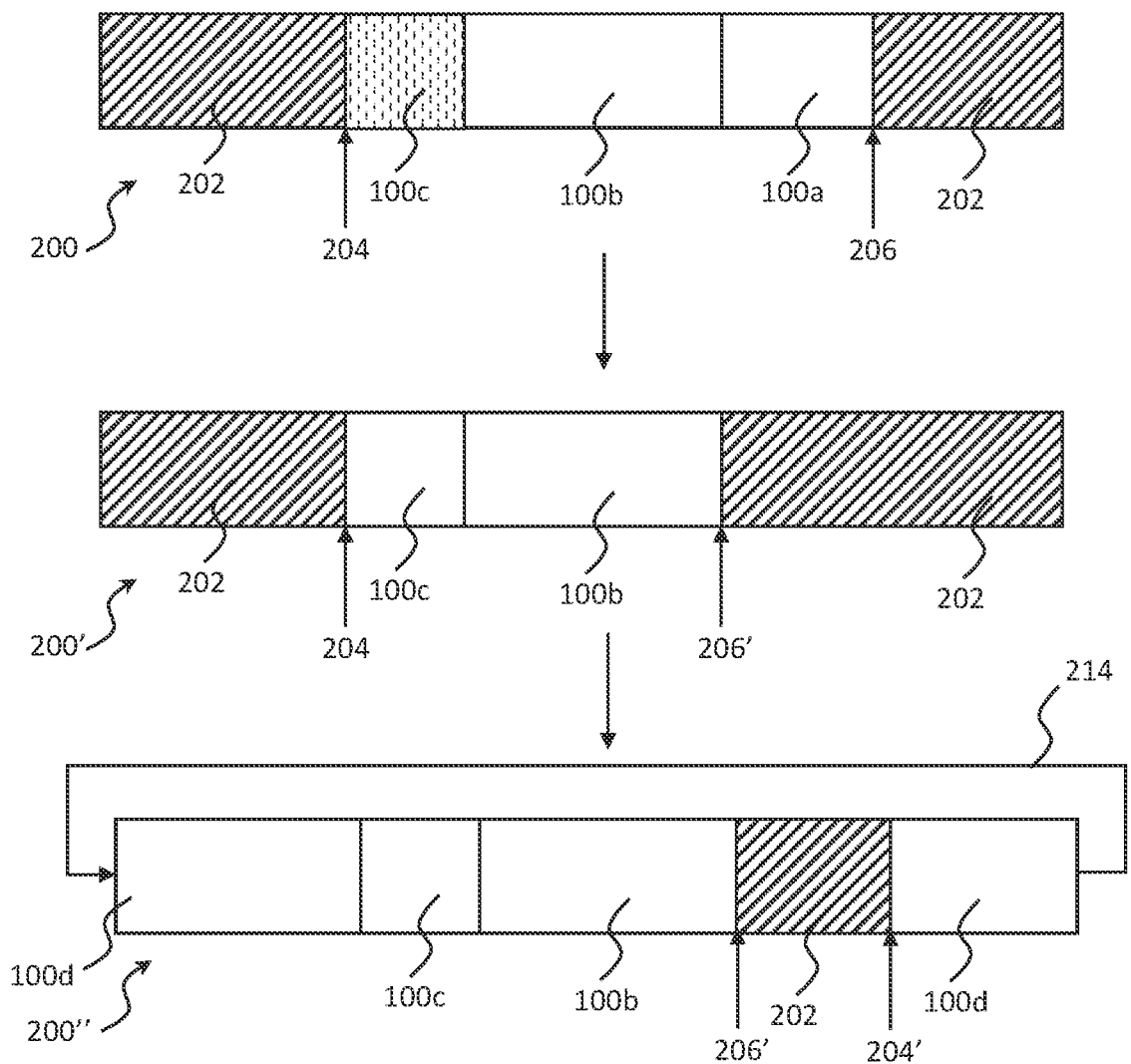

FIG. 6 schematically shows an example of usage of the first storage 200 managed as a circular buffer for storing data structures of FIG. 1. In this example, the processor (not shown) did not find a data structure having a matching VA (e.g., matching to the first VA of the request 300 in FIG. 3). A new data structure with the VA of the first request is thus needed to be requested and inserted into the cache 200. To do this, the processor is configured to determine an available space of the first storage, i.e., the size of the unused portion 202 of the first storage 200. This is done as described in conjunction with FIG. 4. The available size is then compared to a size indicator (ref 304 in FIG. 3) of the request, which represents the size of the data structure corresponding to the VA 302 of the request in external memory.

In the case of FIG. 6, the available space of the first storage 200 is less than first size indicator. To fit a new data structure corresponding to the request, the available space must increase. However, in FIG. 6, the tail data structure 100c is locked (represented by the dotted pattern) and may not be removed. The reason for locking may be one of: the data structure 100c is currently being fetched from external memory but all data is not yet written to the first storage 200, or the data structure is currently used for execution of a task. In both these cases, the data structure 100c may not be deleted from the cache 200. Consequently, the tail data structure 100c may not be deleted and instead, the head data structure 100 may be deleted. This is shown in the middle part of FIG. 6. The second pointer 206' is updated in the second storage (not shown) to be indicative of a storage address in the first storage 200' of a data structure 100b immediately preceding to the head data 100a structure among the plurality of data structures stored in the first storage 200, whereby the data structure 100b immediately preceding to the head tail data structure 100a becomes the head data structure. In case it is still not big enough to hold the new data structure, the process would be repeated such that the next data structure 100c would be the head data structure. However, in the example of FIG. 6, the available space of the first storage 200' exceeds the first size indicator. Consequently, the processor may request a data structure having a VA matching the first VA from external memory, storing the requested data structure in the first storage 200''. During the storage of the data structure 104d, the lock indicator and the status indicator may be updated as described in conjunction with FIG. 4. Storage of the data structure 104d is shown in the lower part of FIG. 6, where the requested data structure 100d is stored in the first storage 200'' as a new tail data structure among the plurality of data structures b-d stored in first storage 200''. The first pointer 204' is updated in the second storage (not shown) to be indicative the storage address in the first storage of the new tail data structure 100d. FIG. 6 shows the first storage 200'' being managed 214 as a circular buffer in that the new data structure 100d continues from the end of the first storage 200'' to the beginning of the first storage 200''. The first pointer 204' is thus updated in the second storage to an address "later" in the first storage 200'' compared to the second pointer 206'. Finally, the processor executes the task based at least in part on the first data of the requested data structure 100d. During execution, the lock indicator of the data structure 100d may be updated as described in conjunction with FIG. 3.

Figure 7:
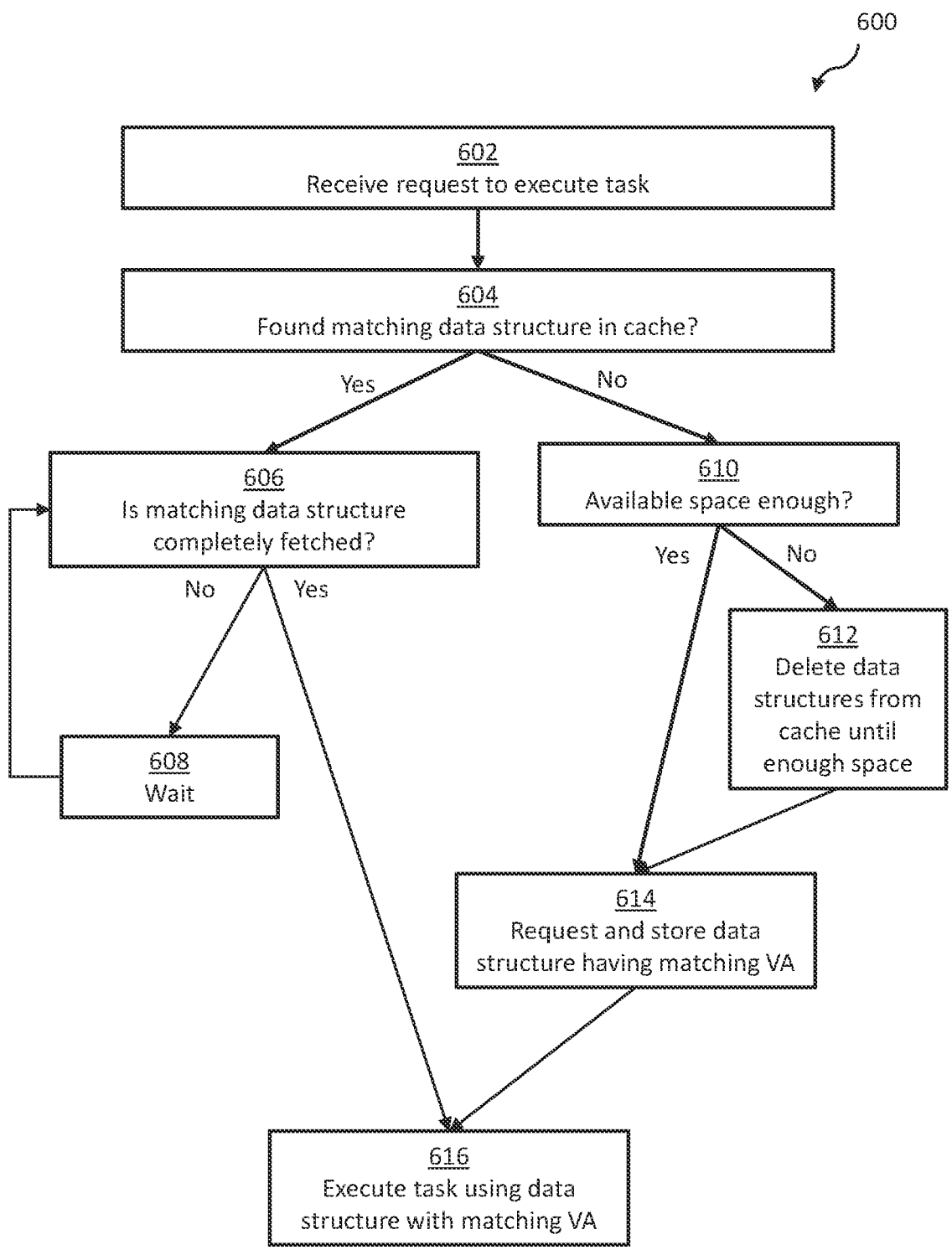
FIG. 7-8 are flow charts of an example process for execution of a task.

FIG. 7 is a flow chart of an example process 600 for execution of a task. The process 600 comprises receiving 602 a request to execute a task. The process further comprises checking 604 if a data structure matching the request may be found in cache. This is done as explained in for example FIG. 3 above by accessing a cache (first storage) storing a plurality of cached data structures, as well as accessing a second storage storing pointers to help traversing through the stored plurality of cached data structures to search for the one matching the request.

In case a matching data structure is found, the process 600 may comprise checking 606 the status indicator of the matching data structure. In case the status indicator indicates that the matching data structure is valid (i.e., not currently being fetched), the task of the request may be executed 616 using the data structure with the matching VA as previously described.

In case the status indicator indicates that the matching data structure is currently being fetched, the process comprises waiting 606 for the status indicator to change value to the first predetermined value and processing the first request again, e.g., by again performing the step of checking 606 the status indicator of the matching data structure, or by starting at the step of receiving 602 the request to execute a task.

In case a matching data structure not found, the process 600 may comprise determining 610 if an available space of the first storage is enough to fit a new data structure referred to in the request, using a size of the first storage and the first and second pointer and the size indicator in the request. If the available space of the first storage meets or exceeds the first size indicator, the new data structure is requested 614 from external memory and stored in the cache (e.g., as described in conjunction with FIG. 4), such that the task of the request may be executed 616 using the data structure with the matching VA as previously described.

In case the available space of the first storage is less than the size indicator of the request, the process comprises deleting 612 data structures from the task until the available space meets or exceeds the size indicator, as described in conjunction with FIGS. 5-6 above and as will be further exemplified in conjunction with FIG. 8 below. When the available space of the first storage meets or exceeds the first size indicator, the new data structure is requested 614 from external memory and stored in the cache (e.g., as described in conjunction with FIG. 4), such that the task of the request may be executed 616 using the data structure with the matching VA as previously described.

Figure 8:
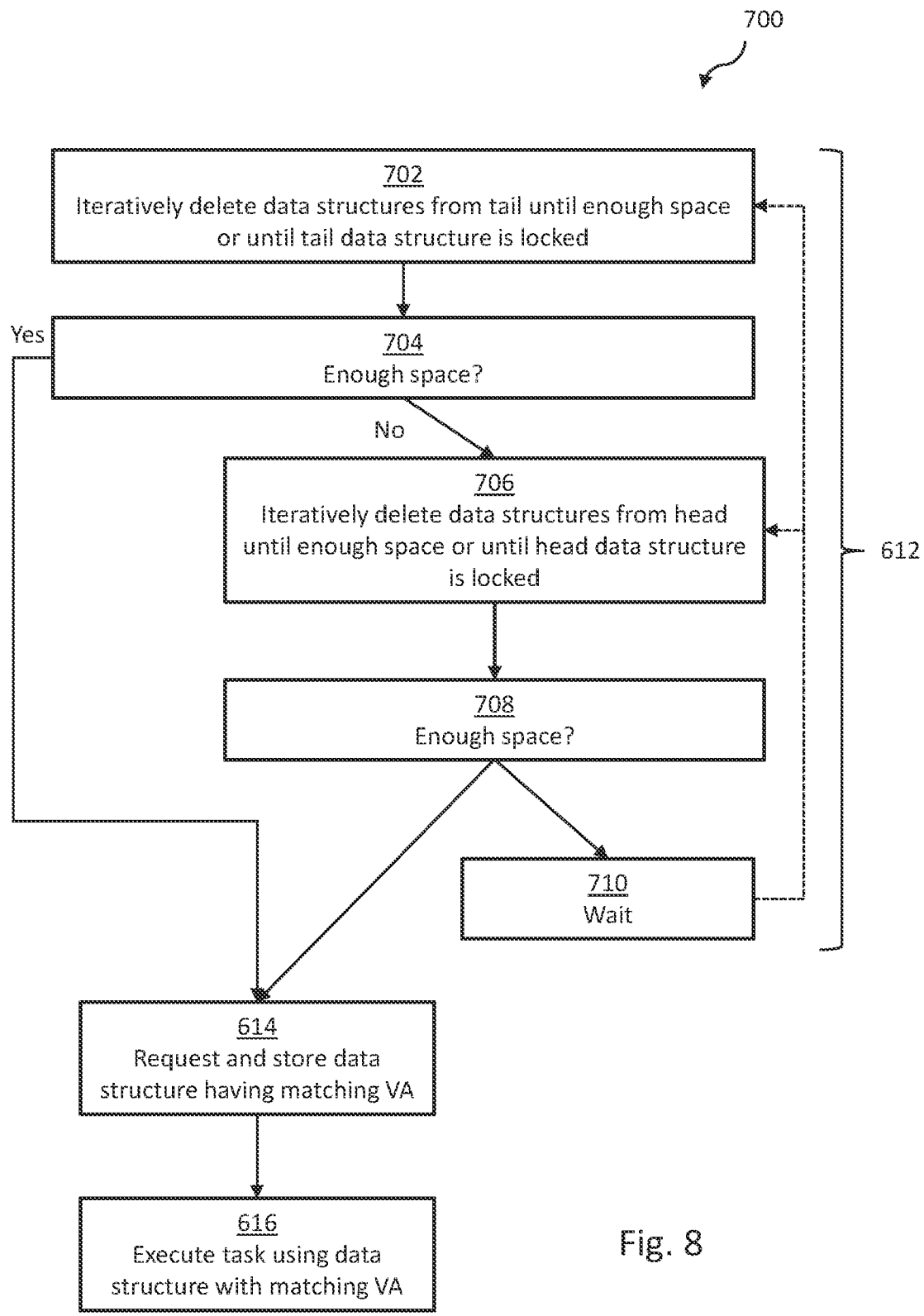

FIG. 8 is a flow chart of an example process 700 for execution of a task, comprising examples of details of the step of deleting 612 data structures from the task until the available space meets or exceeds the size indicator from FIG. 7.

The process 700 is performed in case the available space of the first storage is less than the size indicator of the request. The process 700 comprises iteratively increasing 702 the available space of the first storage by deleting (removing, invalidating) the tail data structure locked (as described in conjunction with FIG. 5) until the available space meets or exceeds the first size indicator or until the lock indicator associated with the tail data structure indicates that the tail data structure is. In case the iterative process 702 results in that the available space meets or exceeds the size indicator of the request (determined in step 704), the process continues as described in FIG. 7 by the new data structure being requested 614 from external memory and stored in the cache (e.g., as described in conjunction with FIG. 4), such that the task of the request may be executed 616 using the data structure with the matching VA as previously described.

In case the iterative process 702 results in that the available space (determined in step 704) still being less than the size indicator of the request (e.g., a locked tail data structure stops the iterative process 702), the process comprises iteratively increasing 706 the available space of the first storage by deleting (removing, invalidating) the head data structure (as described in conjunction with FIG. 6) until the available space meets or exceeds the first size indicator or until the lock indicator associated with the head data structure indicates that the head data structure is locked. In case the iterative process 706 result in that the available space meets or exceeds the size indicator of the request (determined in step 708), the process continues as described in FIG. 7 by the new data structure being requested 614 from external memory and stored in the cache (e.g., as described in conjunction with FIG. 4), such that the task of the request may be executed 616 using the data structure with the matching VA as previously described.

In case the iterative process 706 result in that the available space is still less (determined in step 708) than the size indicator of the request (e.g., a locked head data structure stops the iterative process 706), process 700 comprises waiting 710 for the lock indicator of one of the head data structure and the tail data structure to change value to not being locked (the third predetermined value) and processing the first request again, e.g., by again performing the step of iteratively increasing 706 the available space of the first storage by deleting the head data structure or performing the step of iteratively increasing 702 the available space of the first storage by deleting the tail data structure or by starting at the step of receiving 602 (in FIG. 7) the request to execute a task.

Figure 9:
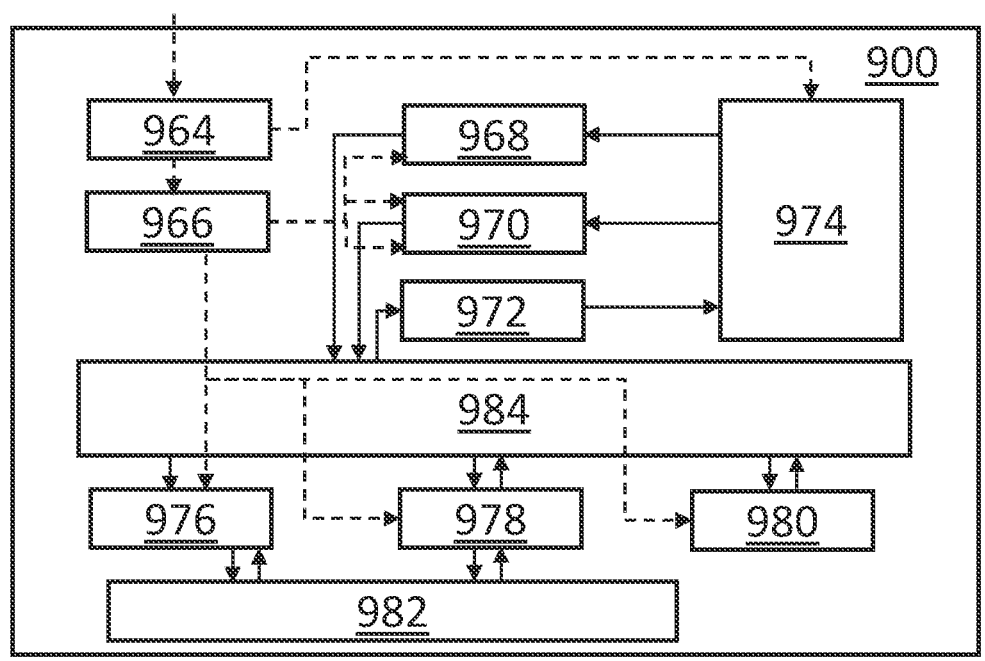
FIG. 9 is a schematic diagram of a neural engine according to examples.

FIG. 9 is a schematic diagram of a neural engine 900, which in this example is used as the processor 306 in accordance with FIG. 3. The neural engine 900 includes a command and control module 964. The command and control module 964 receives tasks from the command processing unit (not shown) and also acts as an interface to storage external to the neural engine 900 (such as a L2 cache) which is arranged to store data to be processed by the neural engine 900 such as data representing a tensor, or data representing a stripe of a tensor. The external storage may additionally store other data to configure the neural engine 900 to perform particular processing and/or data to be used by the neural engine 900 to implement the processing such as neural network weights.

The command and control module 964 interfaces to a handling unit 966, which is for example a traversal synchronization unit (TSU). In this example, each task corresponds to a stripe of a tensor, which is to be convolved with weights to implement a layer of a neural network. The tensor for example represents a feature map for processing using the neural network. A neural network typically includes a sequence of layers of processing, with an output from each layer being used as an input to the next layer. Each layer for example processes an input feature map by convolving the input feature map with a set of weights to generate an output feature map, which is used as the input feature map for the next layer. The term "feature map" is used generically herein to refer to either an input feature map or an output feature map.

In this example, the handling unit 966 splits data representing a stripe of a tensor into a plurality of blocks of data, each of which represents a respective part of the tensor. The handling unit 966 also obtains data structures 100*a-d* as described above for execution of a chain of tasks, for example representing a sequence of layers of the neural network. Such chain of tasks may then be repeated for other block of data. Each data structure may be obtained either from storage external to the neural engine 900 such as the L2 cache, or from a local cache such as (parts of) a storage 984 of the neural engine 900. It should be noted that the storage 984 in FIG. 9 may comprise different partition of storage, where each partition is used for different purposes, such as a first storage managed as a circular buffer to store a plurality of data structures and a second storage to store a first pointer indicative of a storage address in the first storage of a tail data structure of the plural data structures, and a second pointer indicative of a storage address in the first storage of a head data structure of the plural data structures. The first and/or second storage may in other examples be separate from the storage 984.

The handling unit 966 coordinates the interaction of internal components of the neural engine 900, which include a weight fetch unit 968, an input reader 970, an output writer 972, a direct memory access (DMA) unit 974, a dot product unit (DPU) array 976, a vector engine 978, a transform unit 980, an accumulator buffer 982, and the storage 984, for processing of blocks of data. The data dependencies across the functional units are tracked by the handling unit 966. Processing is initiated by the handling unit 966 in a functional unit if all input blocks are available and space is available in the storage 984 of the neural engine 900. The storage 984 may be considered to be a shared buffer, in that various functional units of the neural engine 900 share access to the storage 984.

The weight fetch unit 968 fetches weights associated with the neural network from external storage and stores the weights in the storage 984. The input reader 970 reads data to be processed by the neural engine 900 from external storage, such as a block of data representing part of a tensor. The output writer 972 writes data obtained after processing by the neural engine 900 to external storage, such as a block of data representing part of an output feature map obtained by processing a corresponding part of an input feature map by the neural network represented by the weights fetched by the weight fetch unit 968. The weight fetch unit 968, input reader 970 and output writer 972 interface with the external storage via the DMA unit 974.

The weights and block(s) of data are processed by the DPU array 976, vector engine 978 and transform unit 980 to generate output data which is written out to the external storage by the output writer 972. The DPU array 976 is arranged to efficiently calculate a dot product between two operands, such as between an array of weights and a corresponding block of data (e.g., representing part of a tensor). The vector engine 978 is arranged to perform elementwise operations, for example to apply scale parameters to scale an output of a dot product calculated by the DPU array 976. Data generated during the course of the processing performed by the DPU array 976 and the vector engine 978 is stored temporarily in the accumulator buffer 982, from where it may be retrieved by either the DPU array 976 or the vector engine 978 for further processing as desired.

The transform unit 980 is arranged to perform in-block transforms such as dimension broadcasts or axis swaps. The transform unit 980 obtains data from the storage 984 (e.g., after processing by the DPU array 976 and/or vector engine 978) and writes transformed data back to the storage 984.

To make efficient use of the storage 984 available within the neural engine 900, the handling unit 966 determines an available portion of the storage 984, which is available during execution of part of a first task (e.g., during processing of a block of data associated with the first task by the DPU array 976, vector engine 978 and/or transform unit 980). The handling unit 966 determines a mapping between at least one logical address associated with data generated during execution of a second task (e.g., by processing of a block of data associated with the second task by the DPU array 976, vector engine 978 and/or transform unit 980) and at least one physical address of the storage 984 corresponding to the available portion. The logical address is for example a global address in a global coordinate system. Hence, by altering the physical address corresponding to a given logical address, the handling unit 966 can effectively control usage of the storage 984 without requiring a change in software defining the operation to be performed, as the same logical address can still be used to refer to a given element of the tensor to be processed. The handling unit 966 identifies the at least one physical address corresponding to the at least one logical address, based on the mapping, so that data associated with the logical address is stored in the available portion.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A processor comprising:
   a first storage managed as a circular buffer to store a plurality of data structures, each data structure comprising: an identifier, a status indicator having one of a plurality of values including a first and a second predetermined value, a size indicator and first data associated with instructions for execution of a task;
   a second storage to store a first pointer indicative of a storage address in the first storage of a tail data structure of the plurality of datastructures, and a second pointer indicative of a storage address in the first storage of a head data structure of the plurality of data structures;
   the processor configured to process a first request to execute a task by:
      searching for a data structure of the plurality of data structures in the first storage having an identifier matching a first identifier associated with the first request, wherein a second data structure subsequent to the tail data structure in the first storage is located in the first storage using the first pointer and the size indicator of all data structures preceding the second data structure among the plurality of data structures, wherein the second pointer indicates the last data structure among the plurality of data structures;
      in response to finding the data structure having the identifier matching the first identifier, and the status indicator of the data structure having the first predetermined value, executing the task based at least in part on the first data of the data structure having the identifier matching the first identifier.

2. The processor of claim 1, wherein the processor is further configured to process the first request to execute the task by:
   in response to finding the data structure having the identifier matching the first identifier, and the status indicator of the data structure having the identifier matching the first identifier having the second predetermined value, waiting for the status indicator to change value to the first predetermined value and processing the first request again.

3. The processor of claim 1, wherein the first request to execute the task is associated with a first size indicator, wherein the processor is further configured to process the first request to execute the task by:
  upon not finding the data structure having the identifier matching the first identifier, determining an available space of the first storage using a size of the first storage and the first pointer and second pointer, and upon the available space of the first storage meeting or exceeding the first size indicator, requesting the data structure having the identifier matching the first identifier from external memory, storing the requested data structure in the first storage as a new tail data structure among the plurality of data structures stored in first storage, updating the first pointer in the second storage to be indicative the storage address in the first storage of the new tail data structure, and executing the task based at least in part on the first data of the requested datastructure.

4. The processor of claim 3, wherein storing the requested data structure in the first storage comprises: setting the status indicator of the requested data structure to the second predetermined value, wherein upon storage of the requested data structure being completed, updating the status indicator of the requested data structure to the first predetermined value.

5. The processor of claim 3, wherein each data structure among the plurality of datastructures stored in the first storage is associated with a lock indicator having one of a plurality of values including a third and a fourth predetermined value, wherein the processor is further configured to process the first request to execute the task based on the data structure having the identifier matching the first identifier by:
  while executing the task based at least in part on first data of the data structure having the identifier matching the first identifier stored in the first storage, setting the lock indicator of the data structure to the fourth predetermined value, and upon execution of the task being completed, updating the lock indicator of the data structure to the third predetermined value; and
  wherein storing the requested datastructure in the first storage comprises: setting the lock indicator of the requested data structure to the fourth predetermined value, and wherein upon storage of the requested data structure being completed, updating the lock indicator of the requested datastructure to the third predetermined value.

6. The processor of claim 5, further configured to process the first request to execute the task by:
  upon not finding the datastructure having the identifier matching the first identifier, and upon the available space of the first storage being less than the first size indicator, iteratively increasing the available space of the first storage until meeting or exceeding the first size indicator or until the lock indicator associated with the tail data structure having the fourth predetermined value by:
    updating the first pointer to be indicative of a storage address in the first storage of a data structure immediately subsequent to the tail data structure among the plurality of data structures stored in the first memory, whereby the data structure immediately subsequent to the tail data structure becomes the tail data structure;
  upon the available space of the first storage meeting or exceeding the first size indicator, requesting the data structure having the identifier matching the first identifier from external memory, storing the requested data structure in the first storage as the new tail data structure among the plurality of datastructures stored in first storage, updating the first pointer in the second storage to be indicative the storage address in the first storage of the new tail data structure, and executing the task based at least in part on the first data of the requested data structure.

7. The processor of claim 6, further configured to process the first request to execute the task by:
  upon not finding the datastructure having the identifier matching the first identifier, upon the available space of the first storage being less than the first size indicator, and upon the lock indicator associated with the tail data structure having the fourth predetermined value, iteratively increasing the available space of the first storage until meeting or exceeding the first size indicator or until the lock indicator associated with the head data structure having the fourth predetermined value by:
    updating the second pointer in the second storage to be indicative of a storage address in the first storage of a data structure immediately preceding to the head data structure among the plurality of data structures stored in the first storage, whereby the data structure immediately preceding to the head tail data structure becomes the head data structure;
  upon the available space of the first storage meeting or exceeding the first size indicator, requesting the data structure having the identifier matching the first identifier from external memory, storing the requested data structure in the first storage as the new tail data structure among the plurality of data structures stored in the first storage, updating the first pointer in the storage to be indicative the storage address in the first storage of the new tail data structure, and executing the task based at least in part on the first data of the requested data structure.

8. The processor of claim 7, wherein executing the task further comprises:
  upon not finding the datastructure having the identifier matching the first identifier, upon the available space of the first storage being less than the first size indicator, and upon the lock indicators associated with both the tail data structure and the head data structure having the fourth predetermined value, waiting for the lock indicator of one of the head data structure and the tail data structure to change value to the third predetermined value and processing the first request again.

9. The processor of claim 5, further configured to receiving a second request to execute a task while execution of the task of the first request is ongoing, wherein each data structure among the plurality of data structures stored in the first storage comprises a lock indicator having one bit lock per active task.

10. The processor of claim 1, further configured to receive one or more further requests to execute a task while execution of the task of the first request is ongoing.

11. The processor of claim 1, further comprising a handling unit configured to:
  reading the first data of the data structure having the identifier matching the first identifier from the first storage and executing the task based at least in part on the read first data.

12. The processor of claim 1, wherein a maximum size of a data structure of the plurality of datastructures is less than half a size of the first storage.

13. The processor of claim 1, wherein the task relates to operations in a neural network.

14. The processor of claim 1, wherein the processor is part of a graphics processing unit.

15. A method performed by a processor, the method comprising:
- accessing a first storage managed as a circular buffer and storing a plurality of data structures, each data structure comprising: an identifier, a status indicator having one of a plurality of values including a first and a second predetermined value, a size indicator and first data associated with instructions for execution of a task;
- accessing a second storage storing a first pointer indicative of a storage address in the first storage of a tail data structure of the plurality of data structures, and a second pointer indicative of a storage address in the first storage of ahead data structure of the plurality of data structures;
- processing a first request to execute a task by:
  - searching for a data structure of the plurality of data structures in the first storage having an identifier matching a first identifier associated with the first request, wherein a second datastructure subsequent to the tail data structure in the first storage is located in the first storage using the first pointer and the size indicator of all data structures preceding the second data structure among the plurality of data structures, wherein the second pointer indicates the last data structure among the plurality of data structures;
  - in response to finding the data structure having the identifier matching the first identifier, and the status indicator of the data structure having the first predetermined value, executing the task based at least in part on the first data of the datastructure having the identifier matching the first identifier.

16. The method of claim 15, further comprising:
in response to finding the data structure having the identifier matching the first identifier, and the status indicator of the data structure having the identifier matching the first identifier having the second predetermined value, waiting for the status indicator to change value to the first predetermined value and processing the first request again.

17. The method of claim 15, further comprising:
upon not finding the datastructure having the identifier matching the first identifier, determining an available space of the first storage using a size of the first storage and the first pointer and second pointer; and
upon the available space of the first storage meeting or exceeding a first size indicator associated with the first request:
- requesting the data structure having the identifier matching the first identifier from external memory;
- storing the requested data structure in the first storage as anew tail data structure among the plurality of data structures stored in the first storage;
- updating the first pointer in the storage to be indicative the storage address in the first storage of the new tail data structure; and
- executing the task based at least in part on the first data of the requested data structure.

18. A non-transitory computer-readable storage medium comprising a set of computer-readable instructions stored thereon which, when executed by at least one processor, are arranged to cause the at least one processor to:
- accessing a first storage managed as a circular buffer and storing a plurality of data structures, each data structure comprising: an identifier, a status indicator having one of a plurality of values including a first and a second predetermined value, a size indicator and first data associated with instructions for execution of a task;
- accessing a second storage storing a first pointer indicative of a storage address in the first storage of a tail data structure of the plurality of data structures, and a second pointer indicative of a storage address in the first storage of a head data structure of the plurality of data structures;
- processing a first request to execute a task by:
  - searching for a data structure of the plurality of data structures in the first storage having an identifier matching a first identifier associated with the first request, wherein a second datastructure subsequent to the tail data structure in the first storage is located in the first storage using the first pointer and the size indicator of all data structures preceding the second data structure among the plurality of data structures, wherein the second pointer indicates the last data structure among the plurality of data structures;
  - in response to finding h data structure having the identifier matching the first identifier, and the status indicator of the data structure having the first predetermined value, executing the task based at least in part on the first data of the datastructure having the identifier matching the first identifier.

19. The non-transitory computer-readable storage medium according to claim 18, wherein the set of computer-readable instructions stored thereon are arranged to:
in response to finding the data structure having the identifier matching the first identifier, and the status indicator of the data structure having the identifier matching the first identifier having the second predetermined value, waiting for the status indicator to change value to the first predetermined value and processing the first request again.

20. The non-transitory computer-readable storage medium according to claim 18, wherein the set of computer-readable instructions stored thereon are arranged to:
upon not finding the datastructure having the identifier matching the first identifier, determining an available space of the first storage using a size of the first storage and the first pointer and second pointer;
upon the available space of the first storage meeting or exceeding a first size indicator associated with the first request:
- requesting the data structure having the identifier matching the first identifier from external memory;
- storing the requested data structure in the first storage as anew tail data structure among the plurality of data structures stored in the first storage;
- updating the first pointer in the storage to be indicative the storage address in the first storage of the new tail data structure; and
- executing the task based at least in part on the first data of the requested data structure.

* * * * *